April 2, 1946.  R. J. SHARP  2,397,758
PULPING MACHINE
Filed April 3, 1945   3 Sheets-Sheet 1
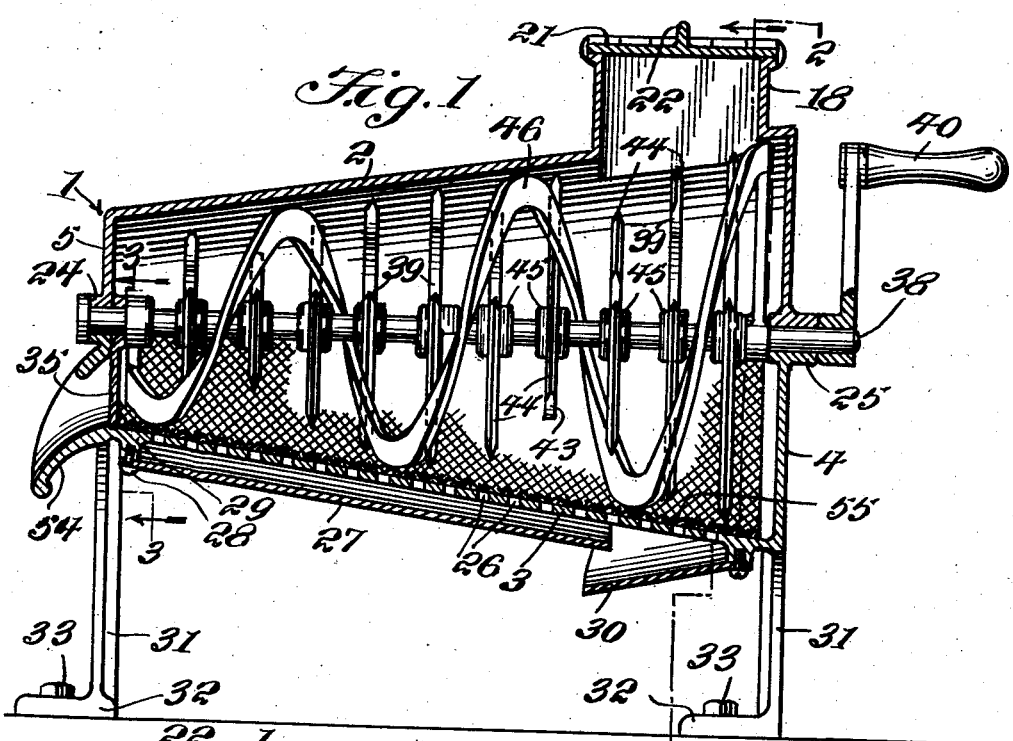
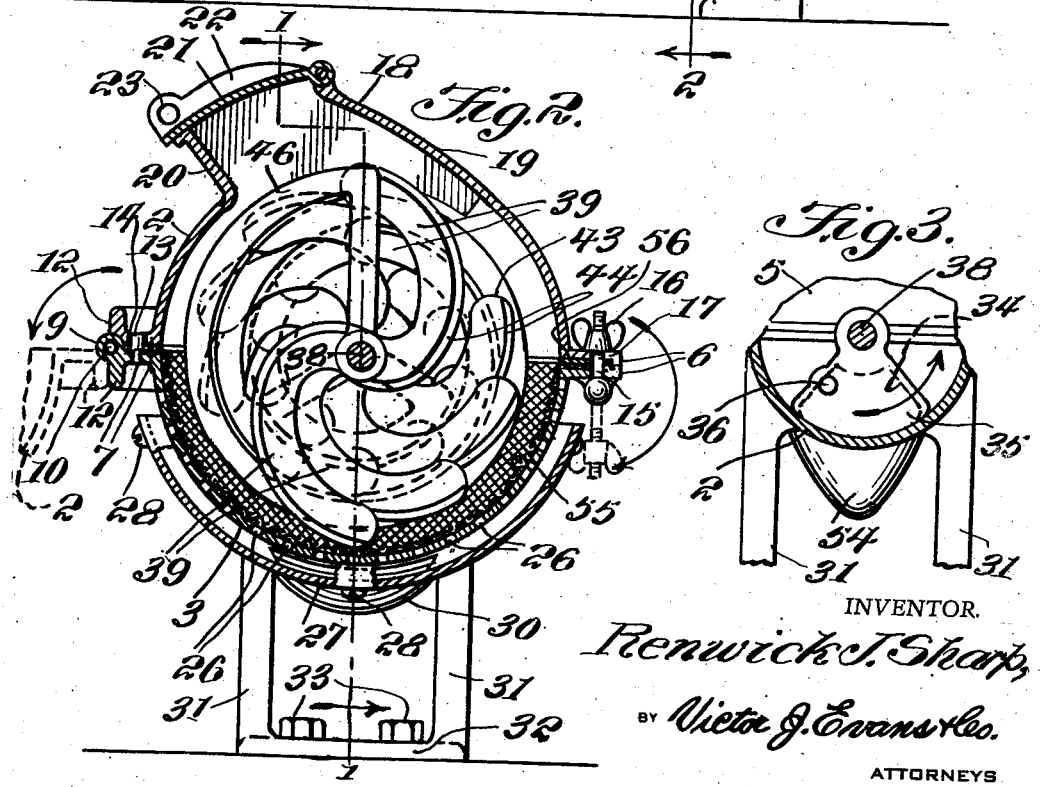
INVENTOR.
Renwick J. Sharp,
BY Victor J. Evans & Co.
ATTORNEYS April 2, 1946.  R. J. SHARP  2,397,758
PULPING MACHINE
Filed April 3, 1945  3 Sheets-Sheet 2
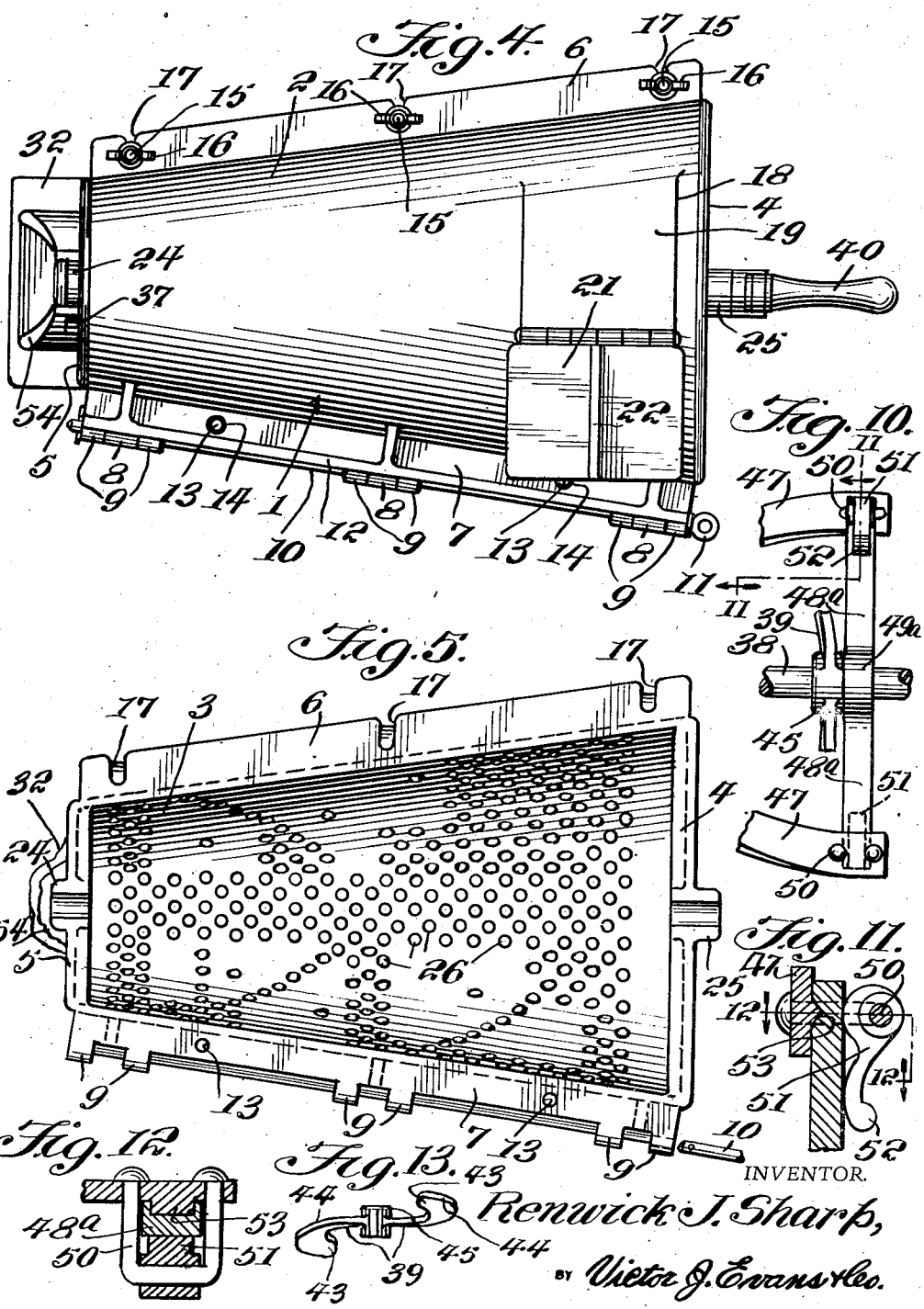

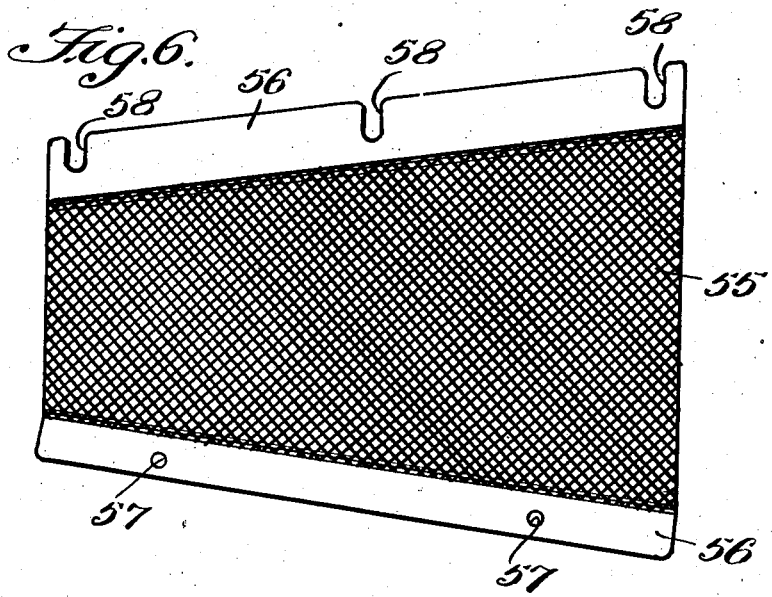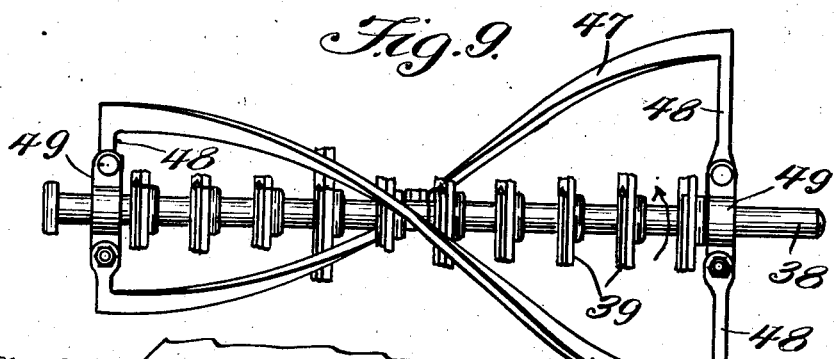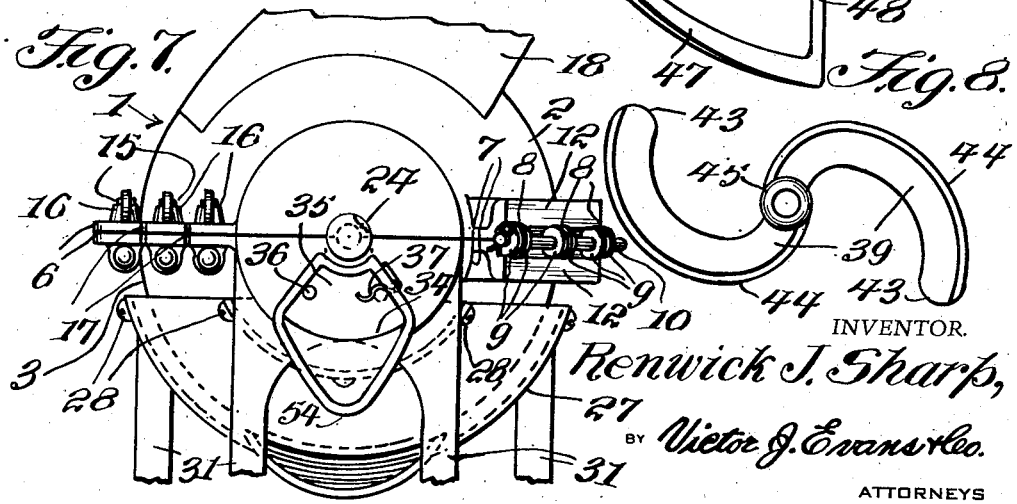

Patented Apr. 2, 1946

2,397,758

UNITED STATES PATENT OFFICE 2,397,758

PULPING MACHINE

Renwick J. Sharp, Guatemala City, Guatemala

Application April 3, 1945, Serial No. 586,337

2 Claims. (Cl. 146—123)

My present invention, in its broad aspect, has to do with improvements in pulping machines for fruits, vegetables, berries and the like, and its unique and novel construction is adapted for either household use or in large sizes for use in hotels, restaurants, factories and the like. More particularly it is my purpose to provide a pulping machine wherein knife edged blades having a slight pitch are used to not only cut up the vegetables, fruits and the like, but to urge the same along the conical housing of my device, and agitate and press the same in cooperation with a squeezer element so that an even, very fine pulp is produced, refuse or bagasse discharged and the juices recovered. Furthermore, the shape and pitch of my cutters and impellers is such that my device does not clog, and all sorts of fruits, vegetables, berries and the like are properly processed and moved through the conical housing. The spiral squeezing bars produce a very fine, even pulp, and are removable so that the cutter, operating without squeezing bars, can be used for mincing, or chopping, as where greens are chopped for salad and the like. I provide an alternate, removable, fine screen for berries and the like, and means for opening up my machine for cleaning, and the parts may be easily kept in a sanitary condition. Furthermore, my invention eliminates the excessive lateral pressure produced by the so-called screw-type pulper, and it is not necessary with my device to partly break-up or "chew" the material to be pulped prior to introduction in my machine, and the conical style housing or casing gives an angular rubbing effect on the mass as well as a holding effect to permit the cutters to cut through the material repeatedly as it is pushed along.

Other and equally important objects and advantages of my invention will be apparent from the following description and drawings, but it is to be understood that changes in the form, size, shape, construction and arrangement of parts may be made without departing from my broad inventive concept, or the scope of the appended claims.

In the drawings wherein I have illustrated a preferred form of my invention:

Figure 1 is a sectional side elevation taken on the line 1—1 of Figure 2;

Figure 2 is a transverse section on the line 2—2 of Figure 1;

Figure 3 is a section on the line 3—3 of Figure 1;

Figure 4 is a top plan view;

Figure 5 is a top plan view with the cover section of the housing or pulping chamber removed;

Figure 6 is a plan view of the removable fine screen used for berries and the like;

Figure 7 is an end view;

Figure 8 is a detailed view of my cutter blades;

Figure 9 is a view of a modified form of spiral squeezer bars.

Figure 10 is a detail view illustrating a slightly modified form of the means for attaching the spiral bars to the shaft arms, such means including eccentric snap clamps;

Figure 11 is a sectional view on the line 11—11 of Figure 10;

Figure 12 is a sectional view on the line 12—12 of Figure 10, and

Figure 13 is a view of one of the cutting blades, showing a slant or pitch which assists in feeding pulp to the discharge end of the device when the spiral bars comprise but few turns, as shown in Figures 9 and 10.

In the drawings wherein like characters of reference are used to designate like or similar parts throughout the several views:

The numeral 1 designates my casing or housing or pulping chamber which is elongated and conical in configuration, and is formed with upper and lower sections 2 and 3 respectively, and shown in Figures 4 and 5. The casing has end walls 4 and 5 and the large and small ends respectively. The sections 2 and 3 have side edge flanges 6 and 7. Flanges 7 of the upper and lower sections have units 8 and 9 or barrels of hinges thereon which interfit in assembly to removably receive a rod 10 therethrough to hingedly and detachably connect the sections together. The rod has an eye 11 to facilitate easy removal. Flanges 7 have right angular opposed extensions 12 which are vertically aligned when the sections are closed and which abut (as shown in dotted lines in Figure 2) when the top is thrown back or opened to form stops. Small pins or knobs 13 fitting in openings 14 in flanges 7 are provided for a purpose which will hereinafter appear. The flange 6 of the bottom section have swivel or shackle bolts 15 with wing nuts 16 which fit in slots 17 in flange 6 of the upper section and clamp down by screwing down the wing nuts 16 to hold the section in closed position, as shown in Figure 1. The top section has a laterally inclined material receiving hopper 18 formed thereon adjacent its large end. The hopper has a side wall 19 formed by gradually continuing the curvature of one side of the section, and another side wall 20 formed at about right angles to the opposite side. A slightly curved hinged cover 21 is provided with a transverse rib 22 terminating in an eye 23 for opening. The end walls 4 and 5 of the section are formed with cooperating elements forming journal bearings 24 and 25.

The bottom section 3—see Figure 5—has many small openings 26 formed therein after the manner of foraminations to strain out liquids and juices, and a double spaced bottom 27 attached by screws 28 to flanges 29 thereon and extending upwardly short of flanges 6 and 7 is provided to catch the liquids and juices which drains to the low end and is dispensed through a down struck nozzle 30. A suitable container may be supplied to catch the liquids and juices.

The bottom section has legs 31 formed with feet 32 for bolting as at 33 to a suitable base. At the small end of the bottom section an opening 34 is provided in the end wall which is closed by a pivoted cover 35 having a pin 36 serving as a stop pin and to be engaged by a spring catch 37—see Figure 7.

Journalled in bearings 24 and 25 is a shaft 38—on which the cover 35 is pivoted—carrying impeller and cutter blades 39 which have pitch to impel the material in the casing from the large end to the small end where the shaft 38 is rotated by handle 40. A motor may be used in place of the handle if desired.

The blades 39—see Figure 8—are substantially arcuately curved and have rounded ends 43 and an outer knife edge 44. The blades are fixed to hubs 45 fixed to the shaft 38 at 180° apart for each pair, and are arranged in equally spaced relation and advanced around the shaft from the large to the small end and having a slight spiral or pitch as shown in Figure 13 to impel, cut and chop the material in the casing and to that end the conical shape of the casing supplies sufficient "drag" on the material to insure the blades passing through the material again and again during the process of pulping. A spiral squeezer bar 46 is fixed to the shaft as shown in Figure 1, and weaves between and around the blades as shown.

A modified form of squeezer is shown in Figure 9. This form comprises a pair of opposed spiral bars 47 which have arms 48 bolted or otherwise secured to hubs 49 fixed to the shaft 38. If desired, the squeezer bars 47 may be removably secured in place by the means shown in Figures 10, 11 and 12. This means comprises arms 48ª fixed to and radiating from hubs 49ª fixed to the shaft 38. At the ends of the bars are pins 50 carrying eccentric snap clasps 51 with handles 52 to engage the arms and clamp the rods removably in place, and a tooth 53 is provided on the end of each bar to fit in a notch in the arm to center and prevent displacement of the same. The same attaching mechanism may be used with the spiral squeezer bar of Figure 1. The dispensing end of my device is the small end with the pivoted cover 35 covering opening 34, and on this end is provided a spout 54 as shown in Figure 1, which spout is curved outwardly and downwardly. In order to more finely strain certain materials placed in the pulping chamber, as for instance berries and the like, I provide a removable screen 55—see Figure 6—which has side flanges 56 and openings 57 on one flange fitting over pins or knobs 13 and slots 58 in the opposite flange fitting about shackle bolts 15; the flanges 56 being placed between flanges 6 and 7 of upper and lower sections 2 and 3 and above and upon the bottom 3, as shown in Figures 1 and 2.

From the foregoing it is believed that the operation of and advantages of my invention will be apparent, but it is again emphasized that interpretation of the scope thereof should only be conclusive when made in the light of the subjoined claims.

I claim:
1. A puluping machine comprising an elongated hollow, conical sectional casing having a removable top section having a hopper and a foraminated bottom section and end walls, said hopper being inclined laterally and provided with a pivoted cover, a removable screen bottom on the bottom of the casing, a reservoir beneath the foraminated bottom, a rotatable shaft journalled in the end walls, a conical impeller and cutter, means carried on the shaft, and including sharpened pitched blades, a conical and spirally shaped squeezer means in the casing and detachably mounted on the shaft about the impeller and cutter means, an outlet opening on one end of the casing and a pivoted latched closure for the opening.

2. The invention as in claim 1 wherein said top and bottom are provided with hinge elements, the casing is provided with legs and a curved semi-conical reservoir beneath and spaced from the foraminated bottom and a nozzle on the reservoir and wherein a single removable hinge rod connects all of the hinge elements forming the top and bottom sections.

RENWICK J. SHARP.